(12) United States Patent
Suenaga et al.

(10) Patent No.: US 9,154,980 B2
(45) Date of Patent: Oct. 6, 2015

(54) FADING SIMULATOR AND FADING SIMULATION METHOD

(71) Applicant: ANRITSU CORPORATION, Kanagawa (JP)

(72) Inventors: Akihiko Suenaga, Kanagawa (JP); Kenichi Nakao, Kanagawa (JP); Motohiro Takagi, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 357 days.

(21) Appl. No.: 13/788,521

(22) Filed: Mar. 7, 2013

(65) Prior Publication Data
US 2013/0260694 A1 Oct. 3, 2013

(30) Foreign Application Priority Data
Mar. 30, 2012 (JP) ................. 2012-080462

(51) Int. Cl.
*H04B 17/00* (2015.01)
*H04W 24/06* (2009.01)
*H04W 24/00* (2009.01)

(52) U.S. Cl.
CPC .............. *H04W 24/06* (2013.01); *H04W 24/00* (2013.01)

(58) Field of Classification Search
USPC ....................................... 455/67.14
See application file for complete search history.

(56) References Cited

U.S. PATENT DOCUMENTS

2012/0176919 A1* 7/2012 Callender et al. ............. 370/252
2012/0178361 A1* 7/2012 Hayashi et al. ................. 455/10

FOREIGN PATENT DOCUMENTS

JP 2009-188932 A 8/2009

OTHER PUBLICATIONS

WO2011036874.*

* cited by examiner

*Primary Examiner* — Ankur Jain
(74) *Attorney, Agent, or Firm* — Pearne & Gordon LLP

(57) ABSTRACT

A fading simulator includes a transition time setting means that sets up a predetermined transition time, at the time of switching of a fading setting using a fading parameter, between the fading setting before switching and the fading setting after switching, and a smoothing processing means that smoothly changes a value before the switching to a value after the switching with respect to at least one of a delay parameter, a Doppler effect parameter and a path loss parameter, during the transition time.

12 Claims, 12 Drawing Sheets

| h11 Path xx | | current | ave | max | min | |
|---|---|---|---|---|---|---|
| | 90% | | | | | [μs] |
| | 50% | | | | | [μs] |

| h12 Path xx | | current | ave | max | min | |
|---|---|---|---|---|---|---|
| | 90% | | | | | [μs] |
| | 50% | | | | | [μs] |

| h21 Path xx | | current | ave | max | min | |
|---|---|---|---|---|---|---|
| | 90% | | | | | [μs] |
| | 50% | | | | | [μs] |

| h22 Path xx | | current | ave | max | min | |
|---|---|---|---|---|---|---|
| | 90% | | | | | [μs] |
| | 50% | | | | | [μs] |

FADING SIMULATOR AND FADING SIMULATION METHOD

TECHNICAL FIELD

The present invention relates to a fading simulator and a fading simulation method for simulating a radio wave propagation environment with respect to a mobile communication terminal such as, for example, a cellular phone or a mobile terminal.

BACKGROUND ART

In recent years, mobile communication terminals such as cellular phones or mobile terminals have been rapidly developed. Radio waves reaching mobile communication terminals from a base station are changed to multiple waves by reflection, scattering, diffraction or the like due to the geographical features of a propagation path thereof, structures or the like, and the amplitude and phase of radio waves vary randomly with location. When radio waves from a base station are received while moving within the propagation path, fading due to the multi-path propagation of radio waves occurs. As a result, code errors increase in a digital communication environment, and transmission qualities considerably deteriorate. For this reason, when the communication performance of the mobile communication terminal is evaluated, devices referred to as a fading simulator that simulates a radio wave propagation environment are used along with base station pseudo devices obtained by simulating a base station.

When tests under a plurality of radio wave propagation environments are continuously performed by changing a plurality of parameters, it is preferable that operations of a fading simulator can be changed in a state where connection between the base station pseudo device and the mobile communication terminal is maintained. For this reason, for example, a fading simulator disclosed in Japanese Unexamined Patent Application Publication No. 2009-188932 is proposed.

The fading simulator disclosed in Japanese Unexamined Patent Application Publication No. 2009-188932 includes a signal processing unit that performs a process of simulating a transmission path with respect to an input signal, and sequentially outputs initial effective process results obtained with respect to the input signal, a signal bypass unit that accumulates the input signal, and starts to read out the accumulated input signal in accordance with a timing at which the initial effective process results are output from the signal processing unit, a signal selection unit that selectively outputs either an output of the signal processing unit or an output of the signal bypass unit, and a control unit that outputs the output of the signal processing unit from the signal selection unit in a period except a period in which a change process of a parameter or a function for the signal processing unit is performed, and outputs the signal, which is read out from the signal bypass unit, from the signal selection unit in a period in which the change process is performed.

In Japanese Unexamined Patent Application Publication No. 2009-188932 having such a configuration, since the signal processing unit notifies the signal bypass unit of an output timing of initial effective process result data obtained with respect to the input signal, and starts to read out the input signal accumulated by the signal bypass unit in accordance with a timing of the notification, a delay of the signal bypass unit can be automatically conformed to the same delay as that of the signal processing unit, and thus signal interruption does not occur at the time of a change in the parameter.

RELATED ART DOCUMENT

Patent Document

Japanese Unexamined Patent Application Publication No. 2009-188932

DISCLOSURE OF THE INVENTION

Problem that the Invention is to Solve

Incidentally, in recent times, in order to simulate a radio wave propagation environment closer to reality, the operation setting of a fading simulator is required to be dynamically changed during a test. Especially, it is considered that a MIMO (Multi-Input Multi-Output communication system) type, which is one of the wireless communication speed-up techniques, is put into practical use and thus the demand thereof is further increased in the future.

However, in Japanese Unexamined Patent Application Publication No. 2009-188932, there is a problem in that a point of discontinuity is generated when the operation setting is changed during a simulation test of fading. That is, since each parameter of fading is instantaneously changed, there is a concern that a drastic change in the amplitude and phase of a signal or a point of discontinuity is generated and thus the evaluation of the communication performance of a mobile communication terminal is influenced.

The present invention is contrived in order to solve the aforementioned problem in the related art, and an object thereof is to provide a fading simulator and a fading simulation method which are capable of preventing a point of discontinuity from being generated even when an operation setting is changed during a simulation test of fading.

Means for Solving the Problem

According to claim 1 of the present invention, there is provided a fading simulator (10) that simulates a multi-input multi-output communication system (MIMO)-type transmission path by adding a fading effect to an input signal, the fading simulator including a parameter setting means (12a) that sets up a fading parameter having at least one of a delay parameter for adding a delay equivalent to a propagation distance of radio waves to the input signal, a Doppler effect parameter for adding thereto a Doppler effect, and a path loss parameter for adding thereto a path loss indicating a reduced level caused by the propagation distance and reflection of radio waves, the fading simulator including: a transition time setting means (12b) that sets up a predetermined transition time, at the time of switching of a fading setting using the fading parameter, between the fading setting before switching and the fading setting after switching; and smoothing processing means (112, 133, and 152) that smoothly change a value before the switching to a value after the switching with respect to at least one of the delay parameter, the Doppler effect parameter and the path loss parameter, during the transition time.

With this configuration, the fading simulator according to claim 1 of the present invention is configured such that since the smoothing processing means smoothly change a value before switching to a value after switching with respect to at least one of the delay parameter, the Doppler effect parameter and the path loss parameter, it is possible to prevent a point of discontinuity from being generated even when the operation setting is changed during a simulation test of fading.

In the fading simulator according to claim 2 of the present invention, the smoothing processing means smoothly change the value before the switching to the value after the switching with respect to the Doppler effect parameter, on the basis of a predetermined time response function.

With this configuration, the fading simulator according to claim 2 of the present invention can smoothly perform switching for the Doppler effect parameter on the basis of the characteristics of a predetermined time response function.

In the fading simulator according to claim 3 of the present invention, an operating unit (11) which is operated by a tester is further included, and the transition time setting means sets up a transition time which is input by causing the tester to operate the operating unit.

With this configuration, the fading simulator according to claim 3 of the present invention can cause the tester to set up an arbitrary transition time before and after the fading setting.

In fading simulator according to claim 4 of the present invention, a smoothing result analysis means (16) that analyzes a smoothing result performed by the smoothing processing means and a display means (13) that displays an analysis result of the smoothing result analysis means are further included.

With this configuration, the fading simulator according to claim 4 of the present invention displays the analysis result of the smoothing result analysis means, and thus can contribute to the setting of test conditions before a main test.

In the fading simulator according to claim 5 of the present invention, the smoothing result analysis means seeks the slowness of a change in the Doppler effect within the transition time, when a smoothing result of the Doppler effect parameter is analyzed.

With this configuration, in the fading simulator according to claim 5 of the present invention, the smoothing result of the Doppler effect parameter can be appropriately analyzed.

In the fading simulator according to claim 6 of the present invention, the display means graphically displays the analysis result of the smoothing result analysis means.

With this configuration, in the fading simulator according to claim 6 of the present invention, the analysis result of the smoothing result analysis means can be presented to the tester by improving visibility.

According to claim 7 of the present invention, there is provided a fading simulation method of simulating a multi-input multi-output communication system (MIMO)-type transmission path by adding a fading effect to an input signal, the fading simulation method including a parameter setting step (S11) of setting up a fading parameter having at least one of a delay parameter for adding a delay equivalent to a propagation distance of radio waves to an input signal, a Doppler effect parameter for adding thereto a Doppler effect, and a path loss parameter for adding a path loss indicating a reduced level caused by the propagation distance and reflection of radio waves, the method including: a transition time setting step (S12) of setting up a predetermined transition time, at the time of switching of a fading setting using the fading parameter, between the fading setting before switching and the fading setting after switching; and a smoothing processing step (S16) of smoothly changing a value before the switching to a value after the switching with respect to at least one of the delay parameter, the Doppler effect parameter and the path loss parameter, during the transition time.

With this configuration, in the fading simulation method according to claim 7 of the present invention, since a value before switching can be smoothly changed to a value after switching, in the smoothing processing step, with respect to at least one of the delay parameter, the Doppler effect parameter and the path loss parameter, it is possible to prevent a point of discontinuity from being generated even when the operation setting is changed during a simulation test of fading.

Advantage of the Invention

The present invention can provide a fading simulator and a fading simulation method having an effect of being capable of preventing a point of discontinuity from being generated even when an operation setting is changed during a simulation test of fading.

BEST MODE FOR CARRYING OUT THE INVENTION

Hereinafter, an embodiment of the present invention will be described with reference to the accompanying drawings.

First, a configuration in an embodiment of a fading simulator according to the present invention will be described.

Figure 1:
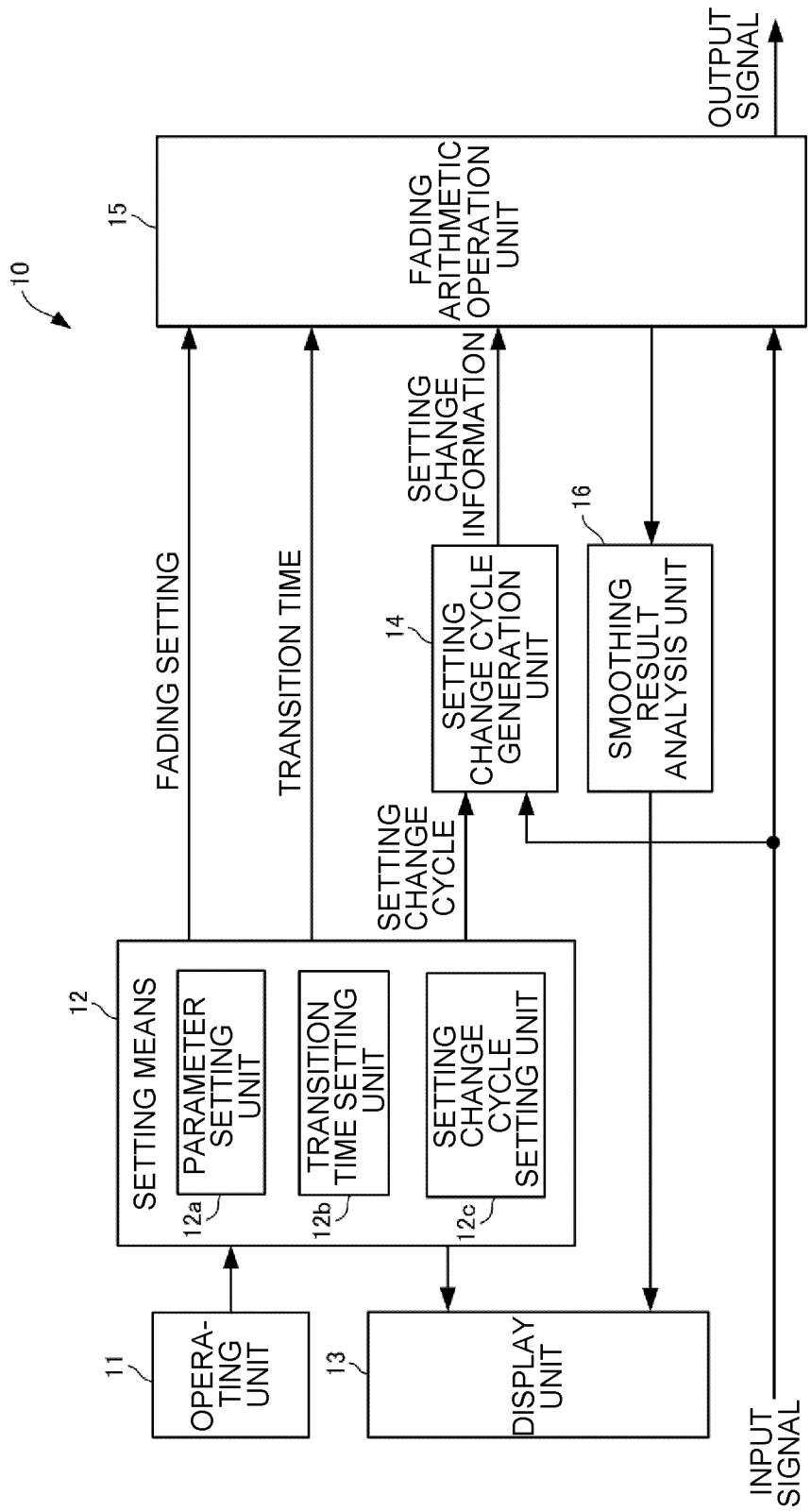
FIG. 1 is a block configuration diagram in an embodiment of a fading simulator according to the present invention.

As shown in FIG. 1, a fading simulator 10 includes an operating unit 11, a setting means 12, a display unit 13, a setting change cycle generation unit 14, a fading arithmetic operation unit 15, and a smoothing result analysis unit 16. The fading simulator 10 simulates MIMO-type M×N transmission paths. Meanwhile, a signal which is input and output by the fading simulator 10 is set to a digital signal.

Figure 2:
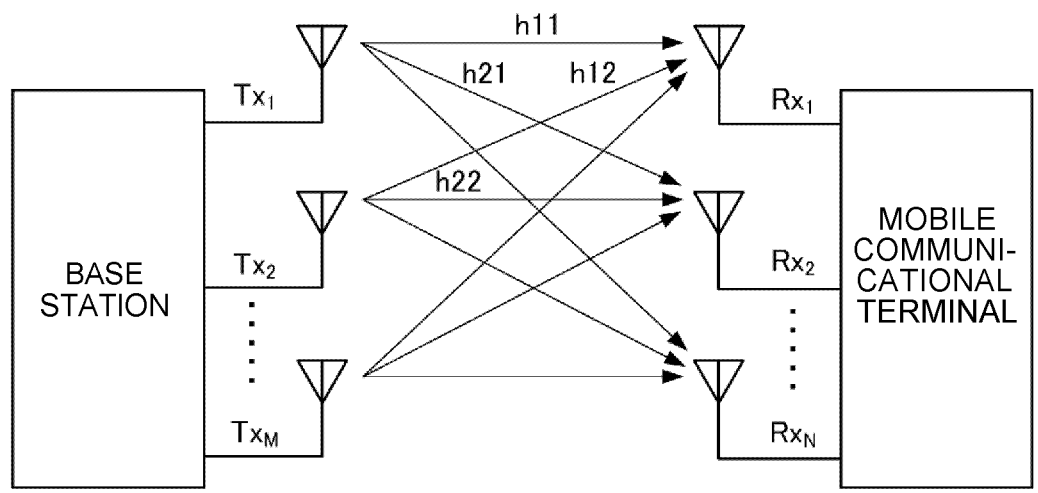
FIG. 2 is a diagram illustrating a MIMO type in an embodiment of the fading simulator according to the present invention.

As shown in FIG. 2, the MIMO type is designed to simultaneously output information, desired to be transmitted to a mobile communication terminal at the base station side, from a plurality of (M) antennas $Tx_1$, $Tx_2$, . . . , $Tx_M$ at the same frequency, cause the mobile communication terminal to receive the information at a plurality of (N) antennas $Rx_1$, $Rx_2$, . . . , $Rx_N$, perform a separation process of the information in the inside of the mobile communication terminal, and realize an improvement in the amount of information transmission.

In the fading simulator 10, various types of signals determined by a setting (hereinafter, referred to as the "fading setting") based on parameters (setting parameters such as, for example, delay, attenuation, and scattering) for adding various types of fading effects which are set up by a tester to an input signal are sequentially output to the mobile communication terminal (not shown) while being repeated by a predetermined number of times. In the present embodiment, the fading setting is set as P, and is indicated by fading settings #1 to #P.

Figure 3:
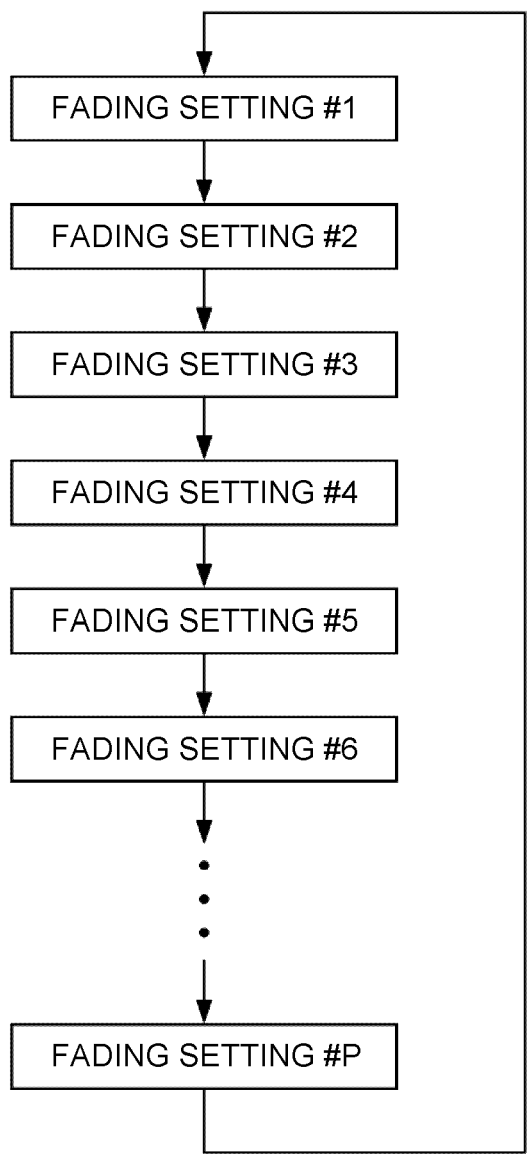
FIG. 3 is a diagram illustrating fading settings in an embodiment of the fading simulator according to the present invention.

As shown in FIG. 3, in the fading simulator 10, signals in which various types of fading effects of the fading settings #1 to #P are added to the input signal are sequentially output to the mobile communication terminal while being repeated, for example, continuously for 10 hours.

The operating unit 11 is operated by a tester in order to set up an input of each test condition in a test of the mobile communication terminal, or contents displayed on the display unit 13, and is constituted by, for example, input devices such as a keyboard, a dial or a mouse, a control circuit that controls these devices, software, and the like.

The test conditions which are input to the operating unit 11 include, for example, each parameter setting value of the fading settings #1 to #P, a communication system of a test signal, a transition time, a setting change cycle, and the like.

The communication system of a test signal includes, for example, WCDMA (Wideband Code Division Multiple Access), LTE (Long Term Evolution), and the like. Here, in the mobile communication, a communication data unit in which communication data is divided in the direction of the time axis is generally specified. This communication data unit is referred to as a frame, a sub-frame, a slot, and the like. Plural types of communication data units are specified depending on the communication system. In this case, it may be configured such that a tester can select what communication data unit to use as a criterion of the setting change cycle described later. Hereinafter, the communication data unit is referred to as a frame. When the communication system (and the frame class) is designated, a frame length or the number of samples included in 1 frame is determined.

The transition time is a time at which during switching from a certain fading setting to a fading setting subsequent thereto, the fading setting is caused to transition between the both, and a tester can set the transition time to an arbitrary time. That is, in the present specification, the term "transition time" means a period for transition.

The setting change cycle is each time length at which signals where various types of fading effects of the fading settings #1 to #P are added to the input signal are output to the mobile communication terminal. For example, the time length is 200 msec in the fading setting #1, and is 300 msec in the fading setting #2. The time lengths may be the same as each other in the fading settings #1 to #P, and may be different from each other. A tester can arbitrarily set the set frame length as a minimum resolution in accordance with test contents. The setting change cycle can also be indicated by the number of frames. Further, referring to the communication system of the test signal, the number of samples included in 1 frame signal is determined, and thus the setting change cycle can also be indicated by the number of samples.

The setting means 12 outputs information of the fading setting, the transition time and the setting change cycle, which is input by causing a tester to operate the operating unit 11, to the fading arithmetic operation unit 15. Specifically, the setting means 12 includes a parameter setting unit 12a that sets up a parameter for performing a fading setting, a transition time setting unit 12b that sets up a transition time, and a setting change cycle setting unit 12c that sets up a setting change cycle. Here, the parameter setting unit 12a constitutes a parameter setting means according to the present invention. In addition, the transition time setting unit 12b constitutes a transition time setting means according to the present invention.

In addition, the setting means 12 outputs information obtained by causing a tester to operate the operating unit 11 to the display unit 13.

The display unit 13 displays the information obtained by causing a tester to operate the operating unit 11, and displays an operation state of a fading test. The display unit 13 constitutes a display means according to the present invention.

The setting change cycle generation unit 14 counts the number of samples of the input signal, and outputs setting change information for changing the setting of a fading setting to the fading arithmetic operation unit 15, on the basis of the number of samples counted. Specifically, when the number of samples counted is equivalent to a setting change cycle value, the setting change cycle generation unit 14 outputs the setting change information to the fading arithmetic operation unit 15. Meanwhile, the setting change cycle value is input from the setting change cycle setting unit 12c.

The fading arithmetic operation unit 15 inputs the input signal, the data and transition time of the fading setting which is set up by the setting means 12, and the setting change information generated by the setting change cycle generation unit 14. The fading arithmetic operation unit 15 adds a fading effect expressed by the fading setting to the input signal and outputs the added signal.

Next, a detailed configuration of the fading arithmetic operation unit 15 will be described with reference to FIG. 4.

Figure 4:
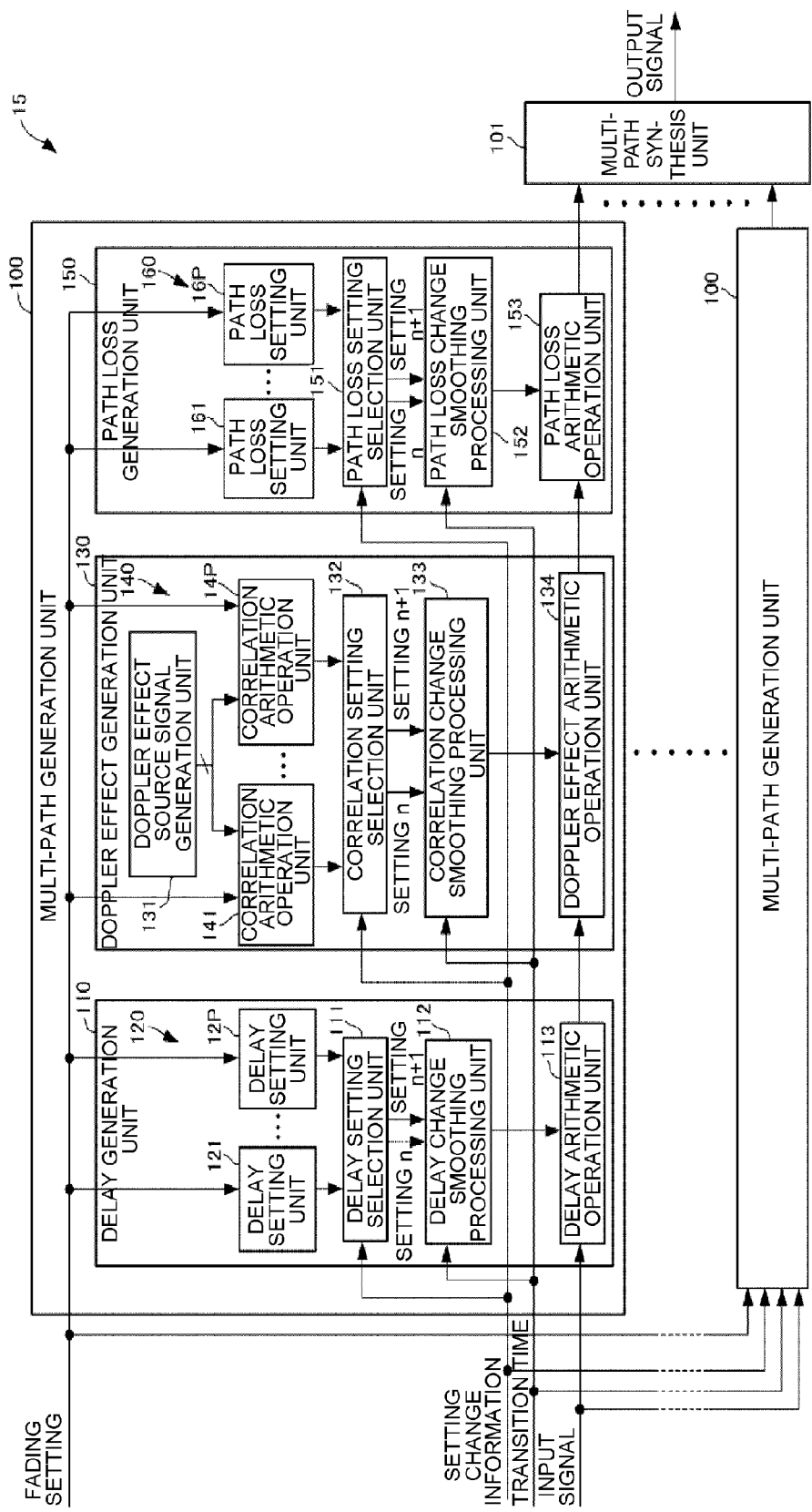
FIG. 4 is a detailed block configuration diagram of a fading arithmetic operation unit in an embodiment of the fading simulator according to the present invention.

As shown in FIG. 4, the fading arithmetic operation unit 15 includes a plurality of multi-path generation units 100 and a multi-path synthesis unit 101 that synthesizes output signals thereof. Each of the plurality of multi-path generation units 100 simulates a path in which fading is generated, and actual fading can be simulated by final synthesis in the multi-path synthesis unit 101.

In order to simulate the fading, the multi-path generation unit 100 includes a delay generation unit 110 that generate a delay equivalent to the propagation distance of radio waves, a Doppler effect generation unit 130 that generates a Doppler effect for adding a scattering effect of radio waves, and a path loss generation unit 150 that generates a path loss indicating a reduced level caused by the propagation distance and reflection of radio waves.

The delay generation unit 110 includes a delay setting means 120, a delay setting selection unit 111, a delay change smoothing processing unit 112, and a delay arithmetic operation unit 113.

The delay setting means 120 is constituted by p delay setting units 121 to 12P provided corresponding to the fading settings #1 to #P. Each of the delay setting units 121 to 12P is configured such that a parameter which relates to a delay among setting parameters of the fading settings #1 to #P is set up.

The delay setting selection unit 111 inputs setting change information from the setting change cycle generation unit 14, selects a corresponding delay setting value from the delay setting units 121 to 12P on the basis of the setting change information, and outputs the delay setting value to the delay change smoothing processing unit 112. That is, the delay setting selection unit 111 selects two delay settings before and after a setting change. For example, when the setting change information includes information on a change from the fading setting #1 to the fading setting #2, the delay setting selection unit 111 selects the delay setting units 121 and 122 corresponding thereto, and outputs the delay setting values of the fading setting #1 and the fading setting #2 to the delay change smoothing processing unit 112.

The delay change smoothing processing unit 112 inputs transition time information from the transition time setting unit 12b, and performs a smoothing process of a delay within the transition time. The delay change smoothing processing unit 112 constitutes a smoothing processing means according to the present invention.

Here, a smoothing process will be described with reference to FIG. 5.

Figure 5:
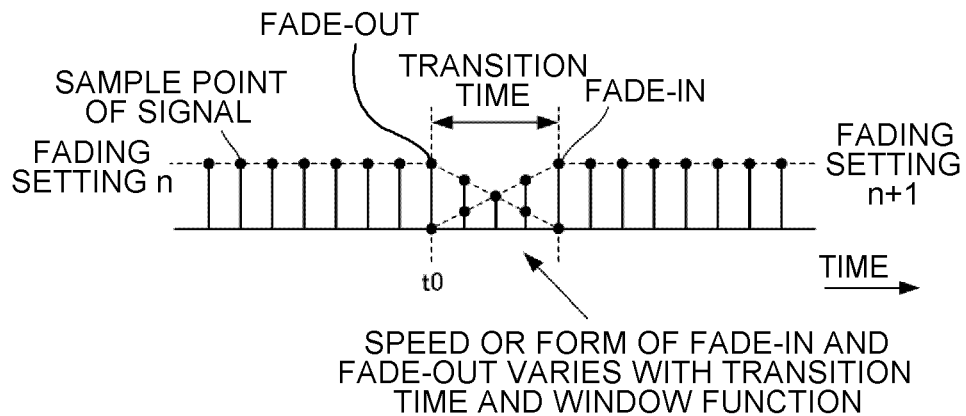
FIG. 5 is a diagram illustrating a smoothing process in an embodiment of the fading simulator according to the present invention.

FIG. 5 conceptually shows a smoothing process when the fading setting is caused to transition from a fading setting n to a fading setting n+1. As shown in the drawing, the setting value of the fading setting n is faded out and the setting value of the fading setting n+1 is faded in so that a change in amplitude and phase between the fading setting n and the fading setting n+1 smoothly happens over time by the transition time which is arbitrarily set up by a tester. That is, in the present specification, the phrase "smoothly changing" means changing the fading setting in a step-by-step manner so that the setting value is approximate from the fading setting n to the fading setting n+1 during the transition time.

Figure 6:
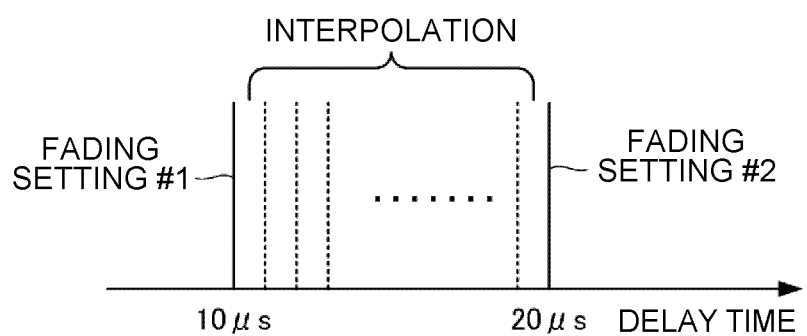
FIG. 6 is a diagram illustrating a smoothing process of a delay performed by a delay change smoothing processing unit in an embodiment of the fading simulator according to the present invention.

In the delay change smoothing processing unit 112, for example, a smoothing process of a delay shown in FIG. 6 is performed. That is, when the fading setting is switched from the fading setting #1 having a delay time of 10 μs to the fading setting #2 having a delay time of 20 μs, the delay change smoothing processing unit 112 interpolates the delay time difference between the both within the transition time, for example, by division into ten parts, and thus the delay time is processed so as to be smoothly changed between the both.

The delay arithmetic operation unit 113 performs a delay process on the input signal in accordance with an output signal of the delay change smoothing processing unit 112.

The delay change smoothing processing unit 112 is constituted by, for example, a RAM, a delay filter and a filter coefficient table in order to perform the above-mentioned process. Meanwhile, instead of the filter coefficient table, for example, a configuration may be used in which a filter coefficient is calculated in real time.

The Doppler effect generation unit 130 includes a Doppler effect source signal generation unit 131, a correlation arithmetic operation means 140, a correlation setting selection unit 132, a correlation change smoothing processing unit 133, and a Doppler effect arithmetic operation unit 134.

The Doppler effect source signal generation unit 131 is constituted by, for example, an AWGN (Additive White Gaussian Noise) signal generator.

The correlation arithmetic operation means 140 is constituted by p correlation arithmetic operation units 141 to 14P provided corresponding to the fading settings #1 to #P. Each of the correlation arithmetic operation units 141 to 14P is configured such that a parameter which relates to a Doppler effect (scattering) among setting parameters of the fading settings #1 to #P is set up.

Here, reference will be made to FIG. 7 to describe configuration examples of the Doppler effect source signal generation unit 131 and the correlation arithmetic operation unit 141.

Figure 7:
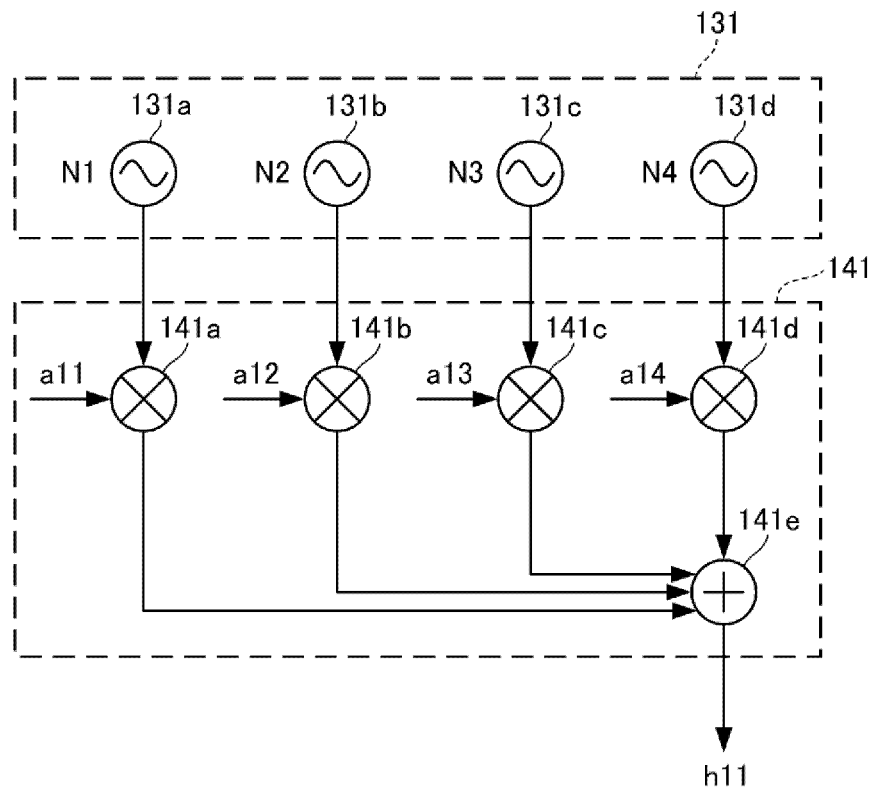
FIG. 7 is a diagram illustrating configuration examples of a Doppler effect source signal generation unit and a correlation arithmetic operation unit in an embodiment of thee fading simulator according to the present invention.

FIG. 7 is a configuration diagram for seeking a channel impulse response h11 between $Tx_1$ and $Rx_1$ among channel impulse responses indicating the transmission characteristics of a radio wave propagation path when two transmitting antennas (M=2) and two receiving antennas (N=2) are formed in the MIMO type shown in FIG. 2.

As shown in the drawing, the Doppler effect source signal generation unit 131 is constituted by four AWGN signal generators 131a to 131d with events independent of each other. Output values of the AWGN signal generators 131a to 131d are N1 to N4, respectively. The output values change along with the time.

The correlation arithmetic operation unit 141 is constituted by multipliers 141a to 141d and an adder 141e. The multipliers 141a to 141d, respectively, multiply output values of the AWGN signal generators 131a to 131d by weighting coefficients a11 to a14 and perform a weighting process. The weighting coefficients a11 to a14 are data included in the fading setting from the setting means 12. The adder 141e adds respective weighing results, and seeks, for example, an AWGN signal corresponding to the channel impulse response h11.

Correlation arithmetic operation units 142 to 14P other than the correlation arithmetic operation unit 141 have the same configuration as that of the above-mentioned correlation arithmetic operation unit 141. That is, the correlation arithmetic operation means 140 outputs an AWGN signal generated on the basis of a Kronecker model expressed by [Expression 1], corresponding to the MIMO type. The mutual correlation (analogy) of channel impulse responses h11, h21, h12, and h22 is expressed by the AWGN signal.

$$\begin{bmatrix} h11 \\ h21 \\ h12 \\ h22 \end{bmatrix} = \begin{bmatrix} a11 & \cdots & a14 \\ \vdots & \ddots & \vdots \\ a41 & \cdots & a44 \end{bmatrix} \begin{bmatrix} N1 \\ N2 \\ N3 \\ N4 \end{bmatrix} \quad \text{[Expression 1]}$$

The correlation setting selection unit 132 inputs setting change information from the setting change cycle generation unit 14, selects a corresponding correlation arithmetic operation output from the correlation arithmetic operation units 141 to 14P on the basis of the setting change information, and outputs the correlation arithmetic operation output to the correlation change smoothing processing unit 133. That is, the correlation setting selection unit 132 selects two correlation arithmetic operation outputs before and after a setting change. For example, when the setting change information includes information on a change from the fading setting #1 to the fading setting #2, the correlation setting selection unit 132 selects the correlation arithmetic operation units 141 and 142, and outputs the correlation arithmetic operation outputs of the fading setting #1 and the fading setting #2 to the correlation change smoothing processing unit 133.

The correlation change smoothing processing unit 133 inputs transition time information from the transition time setting unit 12b, and performs a smoothing process of a correlation change within the transition time, for example, using a predetermined time response function (window function). The window function includes a Blackman window function expressed by [Expression 2], a Hann window function, a Humming window function, a Kaiser window function, a triangular window function, a rectangular window function, and the like. The correlation change smoothing processing unit 133 may perform a process by selecting a window function designated by a tester through the operating unit 11 among the plurality of window functions. In [Expression 2], n denotes an individual sample, N denotes the number of samples, and a final sample of the transition time (see FIG. 5) is set to N−1. Meanwhile, the correlation change smoothing processing unit 133 is constitutes a smoothing processing means according to the present invention.

$$Wfn = 0.42 - 0.5\cos\left(\frac{2\pi n}{N-1}\right) + 0.08\cos\left(\frac{4\pi n}{N-1}\right) \quad \text{[Expression 2]}$$

$$0 \leq n \leq N-1$$

The Doppler effect arithmetic operation unit 134 performs a process of adding a Doppler effect to the input signal in accordance with an output signal of the correlation change smoothing processing unit 133.

The path loss generation unit 150 includes a path loss setting means 160, a path loss setting selection unit 151, a path loss change smoothing processing unit 152, and a path loss arithmetic operation unit 153.

The path loss setting means 160 is constituted by p path loss setting units 161 to 16P provided corresponding to the fading settings #1 to #P. Each of the path loss setting units 161 to 16P is configured such that a parameter which relates to a path loss (attenuation) among setting parameters of the fading settings #1 to #P is set up.

The path loss setting selection unit 151 inputs setting change information from the setting change cycle generation unit 14, selects a corresponding path loss setting value from the path loss setting units 161 to 16P on the basis of the setting change information, and outputs the path loss setting value to the path loss change smoothing processing unit 152. That is, the path loss setting selection unit 151 selects two path loss setting values before and after a setting change. For example, when the setting change information includes information on a change from the fading setting #1 to the fading setting #2, the path loss setting selection unit 151 selects the path loss setting units 161 and 162, and outputs the path loss setting values of the fading setting #1 and the fading setting #2 to the path loss change smoothing processing unit 152.

The path loss change smoothing processing unit 152 inputs transition time information from the transition time setting unit 12b, and performs a smoothing process of a path loss within the transition time. The path loss change smoothing processing unit 152 constitutes a smoothing processing means according to the present invention.

Figure 8:
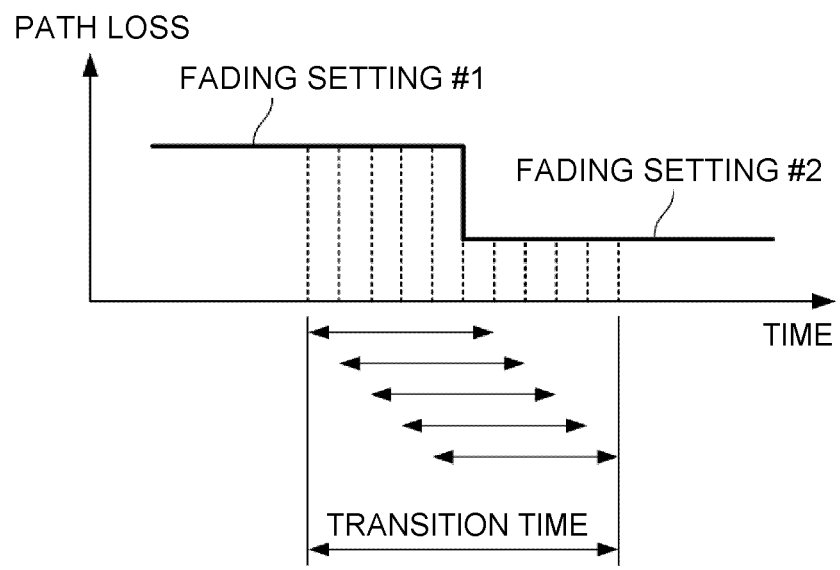
FIG. 8 is a diagram illustrating a smoothing process of a path loss performed by a path loss change smoothing processing unit in an embodiment of the fading simulator according to the present invention.

Specifically, for example, as shown in a conceptual diagram of FIG. 8, the path loss change smoothing processing unit 152 smoothly changes a path loss by seeking a moving average at the transition time of changing the fading setting. In an example shown in FIG. 8, at the transition time, a process of seeking an average value of the path losses of seven sample points is moved in the time direction and is performed in five stages in total. As the number of process stages is increased, the change of the path loss becomes more smoothly.

The path loss arithmetic operation unit 153 performs a process of adding a path loss to the input signal in accordance with an output signal of the path loss change smoothing processing unit 152.

Returning to FIG. 1, the smoothing result analysis unit 16 acquires data of an arithmetic operation result from the fading arithmetic operation unit 15 and displays the data on the display unit 13. The smoothing result analysis unit 16 constitutes a smoothing result analysis means according to the present invention.

Hereinafter, a description will be made of an analytical expression of the smoothing process relating to the Doppler effect performed by the correlation change smoothing processing unit 133 of the fading arithmetic operation unit 15.

The smoothing result analysis unit 16 calculates an analysis correlation value expressed by [Expression 3] with respect to a result obtained by causing the correlation change smoothing processing unit 133 to fade out and fade in a correlation value at the time of a change in the fading setting.

$$\text{analysis correlation value}(\Delta t) = \frac{|E\{h(t0) \cdot h(t0 + \Delta t)^*\}|}{E\{|h(t0)|^2\}} \quad \text{[Expression 3]}$$

Figure 9:
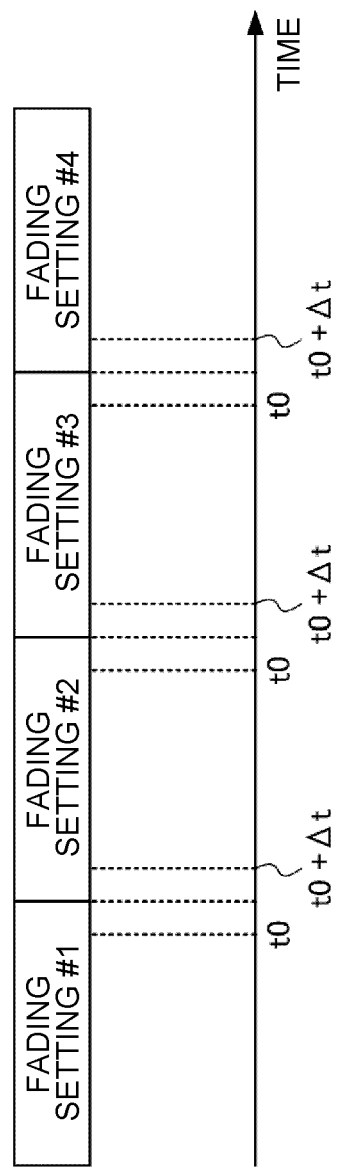
FIG. 9 is a diagram illustrating the calculation of an analysis correlation value in an embodiment of the fading simulator according to the present invention.

[Expression 3] will be specifically described with reference to FIG. 9. FIG. 9 shows a case where the fading setting is sequentially switched from the fading setting #1 to the fading setting #4. In FIG. 9, time t0 indicates the switching start time of the fading setting or a time of an analysis criterion of the analysis correlation value. Time (t0+Δt) indicates the time which elapses by Δt from to.

A function E ( ) written in a denominator and a numerator of [Expression 3] indicates an average of correlation values at time t0 and time (t0+Δt) in a switching point of the fading setting. In an example shown in FIG. 9, a denominator is indicated in [Expression 4], and a numerator is indicated in [Expression 5].

$$E\{|h(t0)|^2\} = \quad \text{[Expression 4]}$$
$$\frac{1}{3}(|h\#1 \to \#2(t0)|^2 + |h\#2 \to \#3(t0)|^2 + |h\#3 \to \#4(t0)|^2)$$

$$|E\{h(t0) \cdot h(t0 + \Delta t)^*\}| = \quad \text{[Expression 5]}$$
$$\frac{1}{3}|(h\#1 \to \#2(t0) \cdot h\#1 \to \#2(t0 + \Delta t)^* + h\#2 \to$$
$$\#3(t0) \cdot h\#2 \to \#3(t0 + \Delta t)^* + h\#3 \to$$
$$\#4(t0) \cdot h\#3 \to \#4(t0 + \Delta t)^*)|$$

In [Expression 3], time Δt with an analysis correlation value of, for example, 0.9 is referred to as 90% coherence time. The smoothing result analysis unit 16 calculates, for example, 90% coherence time and 50% coherence time, and displays the calculation results thereof on the display unit 13 as a table or a graph. As a result, a tester can evaluate the slowness of a change in the change place of the fading setting.

Since the analysis correlation value is calculated as mentioned above, the update interval of the analysis result of the analysis correlation value and the reliability of the display result of the analysis correlation value have a trade-off relationship. That is, when the average number of times is caused to be increased in a process of seeking an average of correlation values as expressed in [Expression 4] and [Expression 5], the update interval of the analysis correlation value becomes a long time, but the reliability of the display result of the analysis correlation value increases. On the other hand, when the average number of times is caused to be decreased, the update interval of the analysis correlation value becomes a short time, but the reliability of the display result of the analysis correlation value decreases.

For this reason, the average number of times required for the calculation of the analysis correlation value can preferably be set in the fading simulator 10 so that a user is able to adjust the above-mentioned trade-off in accordance with the status of use. For example, when the operating unit 11 is caused to have a setting function of the average number of times, and setting information of the average number of times which is input by a user is transmitted from the operating unit 11 to the smoothing result analysis unit 16, the above-mentioned trade-off can be adjusted.

Figures 10, 11:
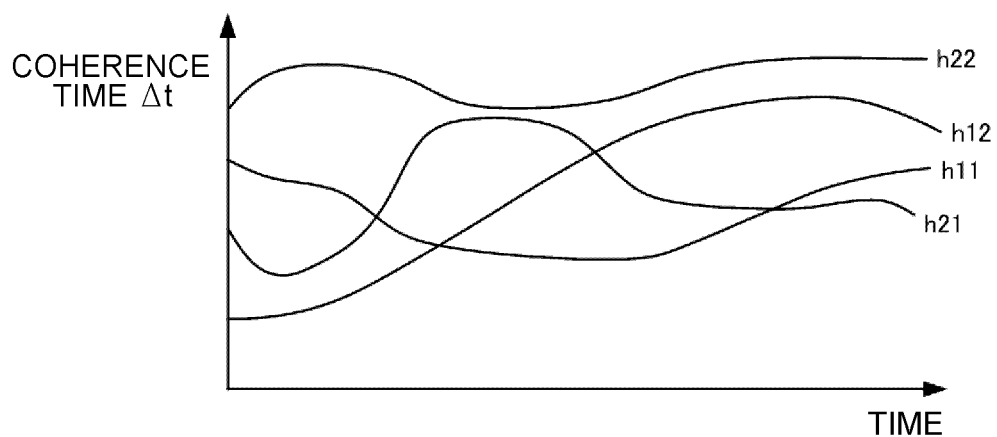
FIG. 10 is a diagram illustrating an example of an analysis result table in which a list is displayed on a display unit by a smoothing result analysis unit in an embodiment of the fading simulator according to the present invention.
FIG. 11 is a diagram illustrating an example of an analysis result graph which is graphically displayed on the display unit by the smoothing result analysis unit in an embodiment of the fading simulator according to the present invention.

FIG. 10 shows an example of an analysis result table displaying a list on the display unit 13 by the smoothing result analysis unit 16. This analysis result table shows a case where 90% coherence time and 50% coherence time are sought with respect to the channel impulse responses h11, h21, h12, and h22.

For example, the fading simulator 10 repeats a loop of #1-#2-#3-#1-#2 . . . when three fading settings #1 to #3 are set up. The display unit 13 is provided with a button for monitoring the coherence time during the operation of the fading simulator 10. Whenever a tester pushes the monitoring button, the display result is updated. Data of the latest coherence time when this button is pushed is displayed in a "current" column. The average value of periods until the button is pushed from a test start is displayed in an "ave" column, the maximum value thereof is displayed in a "max" column, and the minimum value thereof is displayed in a "min" column.

FIG. 11 shows an example of an analysis result graph which is graphically displayed on the display unit 13 by the smoothing result analysis unit 16. The horizontal axis is set to a test time, and the vertical axis is set to the coherence time. Thus, the results of the channel impulse responses h11, h21, h12, and h22 are shown. Meanwhile, in FIG. 11, although each of the results is shown by a solid line, the thickness and shape of the line may be changed or colored so that the results can be identified with each other.

The analysis result table shown in FIG. 10 or the analysis result graph shown in FIG. 11 is displayed on the display unit 13 by the smoothing result analysis unit 16, so that a tester can confirm the setting of the window function or the transition time in advance, for example, before a main test is performed, and can perform an appropriate condition setting.

Meanwhile, the smoothing result analysis unit 16 may be configured to have a log function of storing data of the analysis result. Thereby, a tester can confirm the stored log, or can process log data to thereby use the processed data in a different analysis.

Returning to FIG. 1, the multi-path synthesis unit 101 synthesizes output signals of a plurality of multi-path generation units 100, and outputs the synthesized signal.

Figure 12:
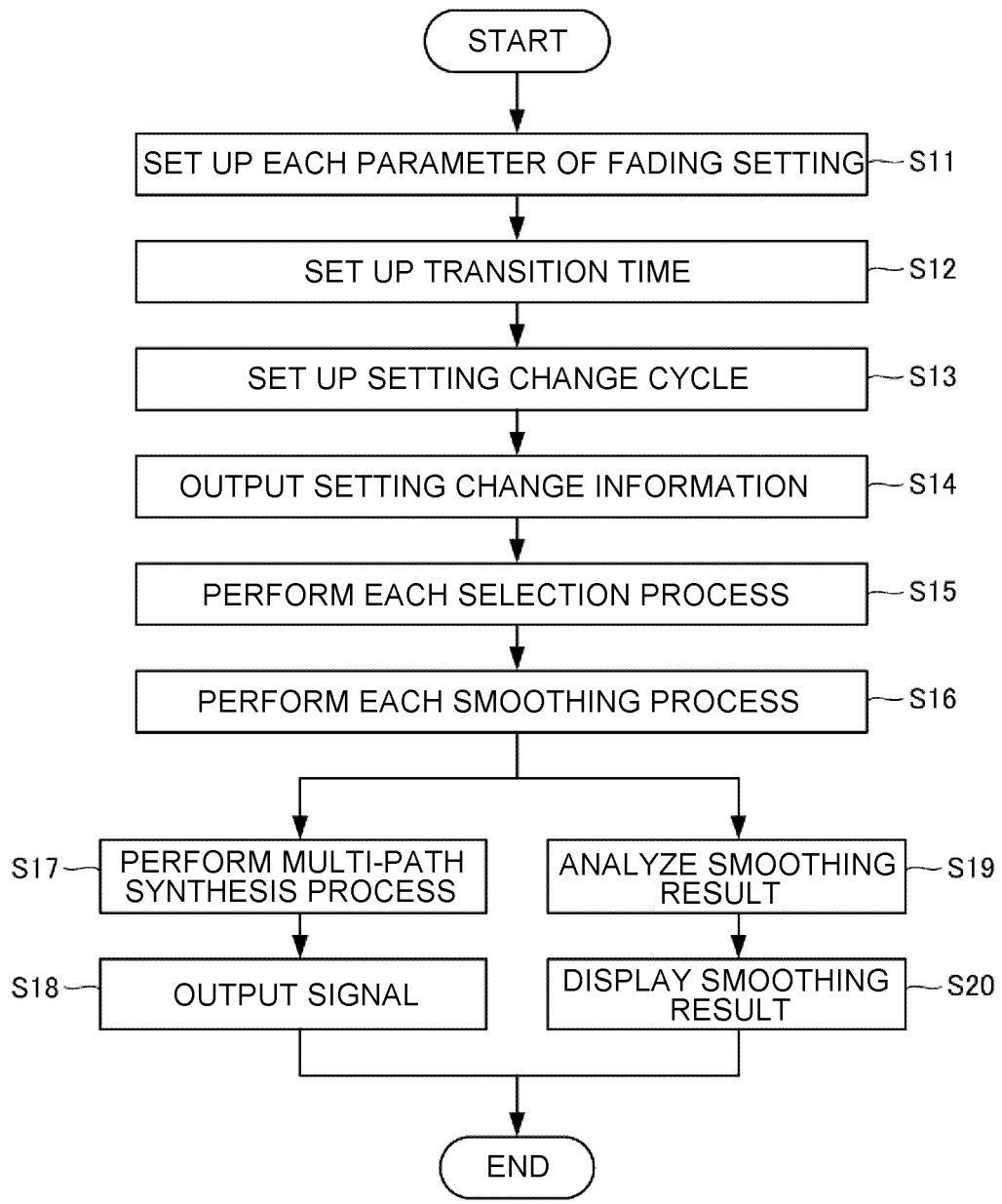
FIG. 12 is a flow diagram illustrating operations in an embodiment of the fading simulator according to the present invention.

Next, operations of the fading simulator 10 in the present embodiment will be described with reference to FIG. 12. The flow diagram shows a fading simulation method according to the present invention.

The parameter setting unit 12a sets up each parameter for performing the fading setting on the basis of information which is input by causing a tester to operate the operating unit 11 (step S11), and outputs the set-up parameter to the fading arithmetic operation unit 15.

Each parameter includes, for example, a delay parameter for adding a delay equivalent to the propagation distance of radio waves, a scattering parameter for adding a scattering effect of radio waves, a path loss parameter for adding a path loss indicating a reduced level caused by the propagation distance and reflection of radio waves, and the like.

The transition time setting unit 12b sets up a transition time on the basis of the information which is input by causing a tester to operate the operating unit 11 (step S12), and outputs the set-up transition time to the fading arithmetic operation unit 15.

The setting change cycle setting unit 12c sets up a setting change cycle (step S13), and outputs a setting change cycle value to the setting change cycle generation unit 14.

The setting change cycle generation unit 14 counts the number of samples of the input signal, and outputs setting change information for changing the setting of the fading setting to the fading arithmetic operation unit 15, on the basis of the number of samples counted (step S14).

The delay setting selection unit 111 of the delay generation unit 110, the correlation setting selection unit 132 of the Doppler effect generation unit 130, and the path loss setting selection unit 151 of the path loss generation unit 150 input the setting change information from the setting change cycle generation unit 14, and perform a selection process (step S15).

Specifically, when the setting change information includes information on a change from the fading setting #1 to the fading setting #2, a selection process is performed as follows.

The delay setting selection unit 111 selects the delay setting units 121 and 122 corresponding thereto, and inputs delay setting values of the fading setting #1 and the fading setting #2.

The correlation setting selection unit 132 selects the correlation arithmetic operation units 141 and 142, and inputs correlation arithmetic operation outputs of the fading setting #1 and the fading setting #2.

The path loss setting selection unit 151 selects the path loss setting units 161 and 162, and inputs path loss setting values of the fading setting #1 and the fading setting #2.

The delay change smoothing processing unit 112 of the delay generation unit 110, the correlation change smoothing processing unit 133 of the Doppler effect generation unit 130, and the path loss change smoothing processing unit 152 of the path loss generation unit 150 input the transition time information, and perform the smoothing process (step S16).

The delay change smoothing processing unit 112 interpolates the delay time difference, for example, before and after the switching of the fading setting by division into predetermined numbers, and thus the delay time is processed so as to be smoothly changed between the both.

The correlation change smoothing processing unit 133 performs the smoothing process of a correlation change using a predetermined time response function (for example, Blackman window function).

The path loss change smoothing processing unit 152 smoothly changes a path loss by seeking a moving average, for example, at the transition time of changing the fading setting.

The multi-path synthesis unit 101 synthesizes output signals of a plurality of multi-path generation units 100 (step S17), and outputs the synthesized signal (step S18).

In parallel with steps S17 and S18, the smoothing result analysis unit 16 acquires data of the arithmetic operation result from the fading arithmetic operation unit 15, and analyzes a smoothing process result (step S19), and the display unit 13 displays the smoothing process result (step S20).

Figure 13:
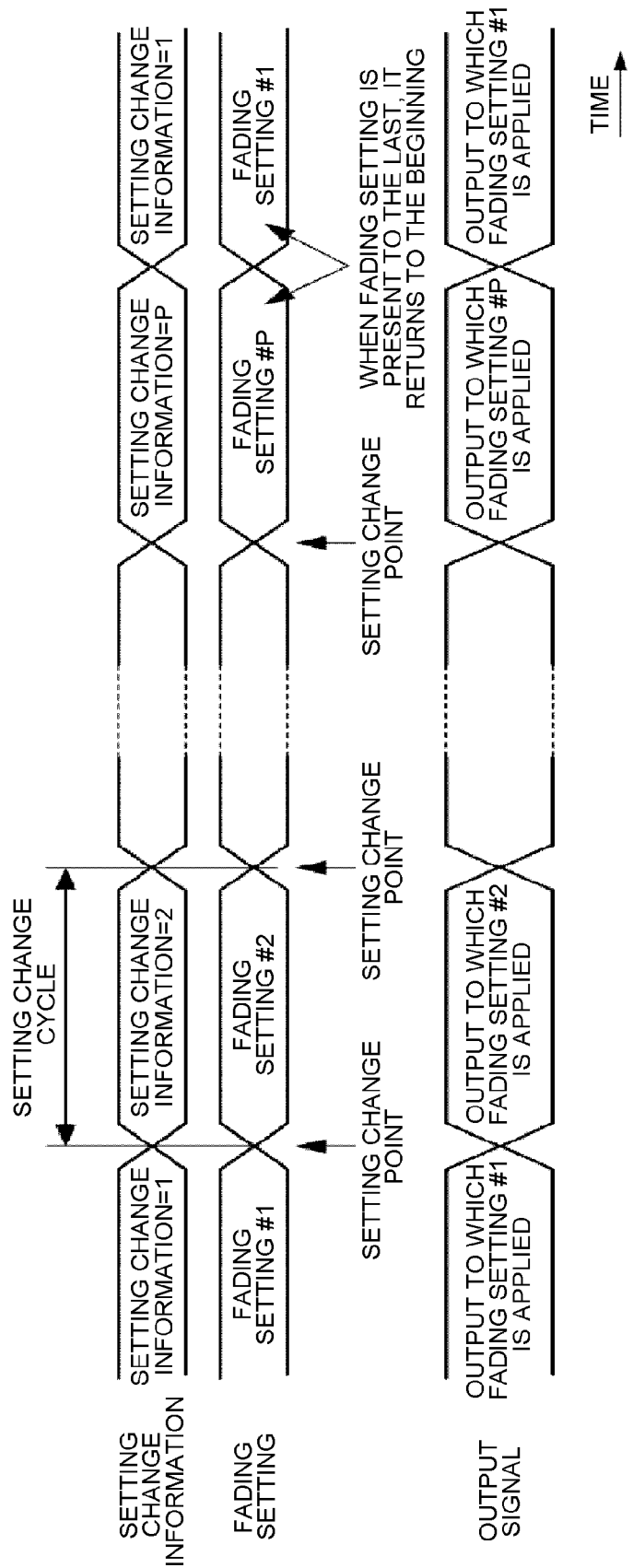
FIG. 13 is a timing diagram illustrating operations in an embodiment of the fading simulator according to the present invention.

Next, the operations of the fading simulator 10 are shown in a timing diagram of FIG. 13.

When the setting change information indicates #1, the fading setting becomes #1, and the fading setting #1 is applied to the output signal.

Next, when the setting change information is changed to #2, the fading setting becomes #2, and a signal to which the fading setting #2 is applied is output.

Here, the above-mentioned smoothing process is performed in a setting change point in which setting change information #1 is changed to setting change information #2.

Meanwhile, after the setting change information becomes final #P and a signal to which the fading setting #P is applied is output, the setting change information returns to #1, and repetition is performed after this.

As stated above, the fading simulator 10 in the present embodiment includes a configuration in which a value before switching is smoothly changed to a value after switching. Therefore, even when operation settings are changed during the simulation test of fading, it is possible to prevent a point of discontinuity from being generated.

Meanwhile, the above-mentioned embodiment illustrates an example in which the number of each of the delay setting units, the correlation arithmetic operation units, and the path loss setting units provided corresponding to the fading settings #1 to #P is P, but the present invention is not limited thereto. For example, a configuration may be used in which the number of each of the delay setting units, the correlation arithmetic operation units, and the path loss setting units is two, and the setting unit which is not used in the arithmetic operation is sequentially updated by the setting means 12.

In addition, in the above-mentioned embodiment, the configuration in which three of the delay generation unit 110, the Doppler effect generation unit 130, and the path loss generation unit 150 are included is illustrated by way of example, but a fading simulator including at least one of them may be used.

Figure 14:
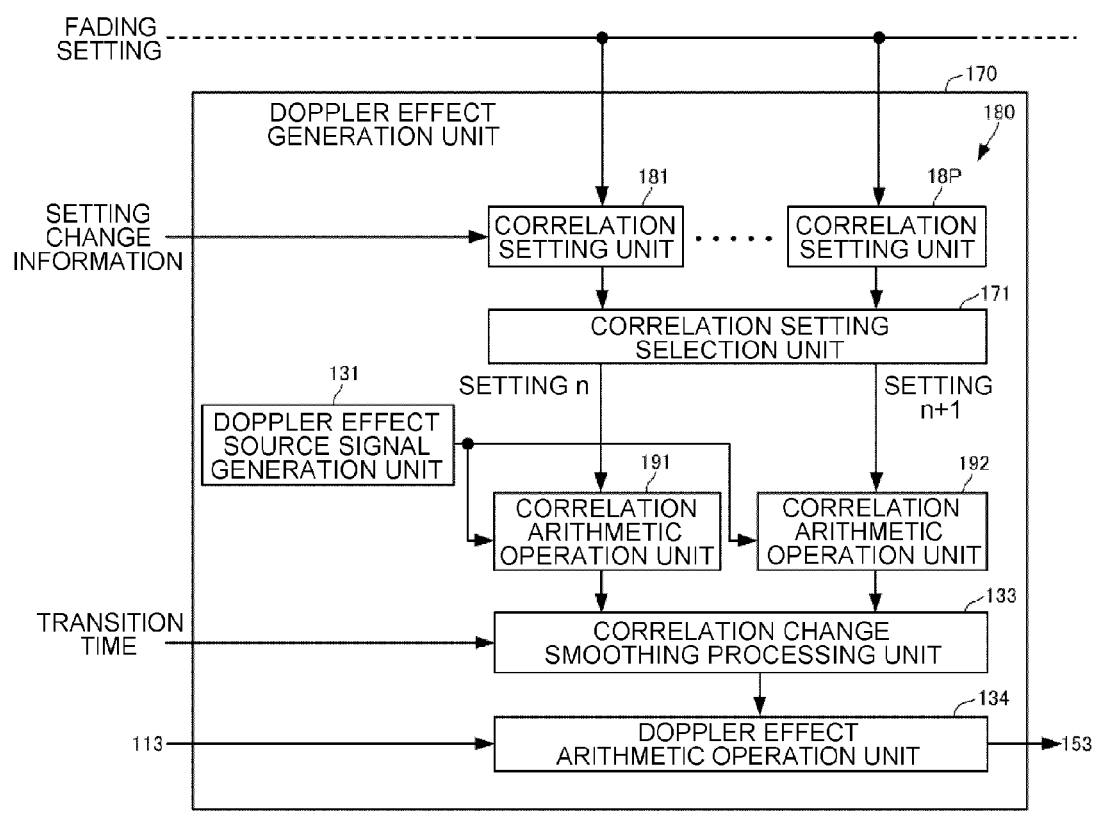
FIG. 14 is a block configuration diagram illustrating another aspect of a Doppler effect generation unit in an embodiment of the fading simulator according to the present invention.

In addition, a Doppler effect generation unit 170 having a configuration shown in FIG. 14 may be used instead of the Doppler effect generation unit 130 of the above-mentioned embodiment. In the correlation setting unit 180, the weighting coefficients a11 to a14 included in the fading setting from the setting means 12 (see FIG. 1) are set up. A correlation setting selection unit 171 selects two corresponding correlation setting units from P correlation setting units 181 to 18P, and outputs each of the weighting coefficients in two correlation arithmetic operation units 191 and 192. Two correlation arithmetic operation units 191 and 192 perform a correlation arithmetic operation process similarly to the correlation arithmetic operation unit 141 of the above-mentioned embodiment, and perform an output to the correlation change smoothing processing unit 133. The correlation change smoothing processing unit 133 and the Doppler effect arithmetic operation unit 134 function similarly to the above-mentioned embodiment, and perform a process of adding a Doppler effect. Such a configuration includes two correlation arithmetic operation units, and thus can be formed more simply.

Figure 15:
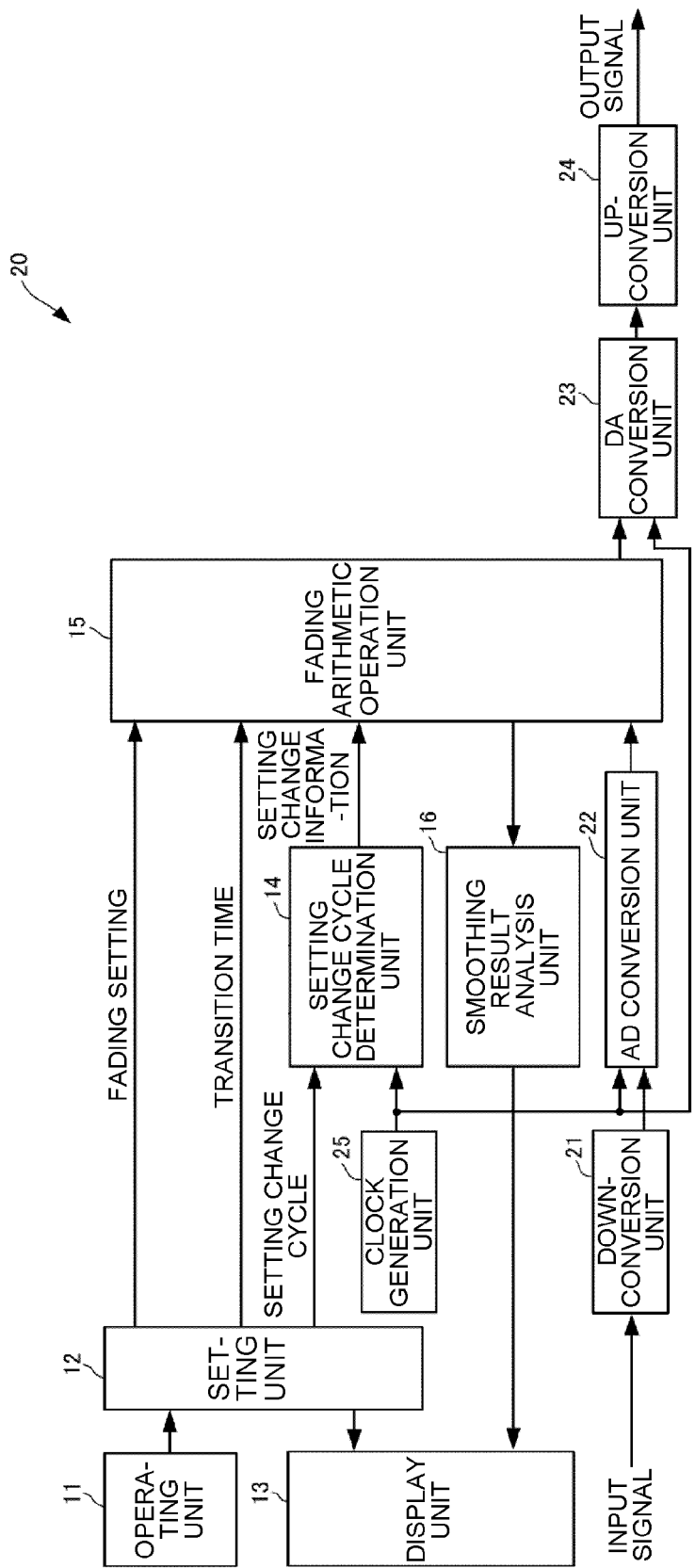
FIG. 15 is a block configuration diagram illustrating another aspect in an embodiment of the fading simulator according to the present invention.

Next, another aspect of the fading simulator will be described. In the above-mentioned embodiment, the input and output signal is set to a digital signal. The fading simulator 20 shown in FIG. 15 has a configuration in which an analog signal is dealt with as an input and output signal.

That is, the fading simulator 20 includes a down-conversion unit 21, an AD conversion unit 22, a DA conversion unit 23, an up-conversion unit 24, and a clock generation unit 25.

The down-conversion unit 21 inputs an RF (radio frequency) signal of an analog value as an input signal, and converts the RF signal into a baseband signal.

The AD conversion unit 22 converts the baseband signal of an analog value into a baseband signal of a digital value and then samples the converted signal to output the sampled signal to the fading arithmetic operation unit 15.

The DA conversion unit 23 converts the baseband signal of a digital value which is output by the fading arithmetic operation unit 15 into a baseband signal of an analog value.

The up-conversion unit 24 converts the baseband signal of an analog value which is output by the DA conversion unit 23 into a predetermined RF signal.

The clock generation unit 25 generates a clock for sampling the input and output signal, and outputs the clock to the setting change cycle generation unit 14.

Therefore, the fading simulator 20 can obtain the same effect as that of the above-mentioned fading simulator 10 in the configuration in which the analog signal is input and output.

INDUSTRIAL APPLICABILITY

As stated above, the fading simulator and the fading simulation method according to the present invention have an effect of being capable of preventing a point of discontinuity from being generated even when operation settings are changed during the simulation test of fading, and are useful as a fading simulator and a fading simulation method for simulating a radio wave propagation environment with respect to a mobile communication terminal such as a cellular phone or a mobile terminal.

DESCRIPTION OF REFERENCE NUMERALS AND SIGNS 10, 20: FADING SIMULATOR
11: OPERATING UNIT
12: SETTING MEANS
12a: PARAMETER SETTING UNIT (PARAMETER SETTING MEANS)
12b: TRANSITION TIME SETTING UNIT (TRANSITION TIME SETTING MEANS)
12c: SETTING CHANGE CYCLE SETTING UNIT
13: DISPLAY UNIT (DISPLAY MEANS)
14: SETTING CHANGE CYCLE GENERATION UNIT
15: FADING ARITHMETIC OPERATION UNIT
16: SMOOTHING RESULT ANALYSIS UNIT (SMOOTHING RESULT ANALYSIS MEANS)
100: MULTI-PATH GENERATION UNIT
101: MULTI-PATH SYNTHESIS UNIT
110: DELAY GENERATION UNIT
111: DELAY SETTING SELECTION UNIT
112: DELAY CHANGE SMOOTHING PROCESSING UNIT (SMOOTHING PROCESSING MEANS)
113: DELAY ARITHMETIC OPERATION UNIT

120: DELAY SETTING MEANS
121 to 12P: DELAY SETTING UNIT
130, 170: DOPPLER EFFECT GENERATION UNIT
131: DOPPLER EFFECT SOURCE SIGNAL GENERATION UNIT
132, 171: CORRELATION SETTING SELECTION UNIT
133: CORRELATION CHANGE SMOOTHING PROCESSING UNIT (SMOOTHING PROCESSING MEANS)
134: DOPPLER EFFECT ARITHMETIC OPERATION UNIT
140: CORRELATION ARITHMETIC OPERATION MEANS
141 to 14P, 191, 192: CORRELATION ARITHMETIC OPERATION UNIT
150: PATH LOSS GENERATION UNIT
151: PATH LOSS SETTING SELECTION UNIT
152: PATH LOSS CHANGE SMOOTHING PROCESSING UNIT (SMOOTHING PROCESSING MEANS)
153: PATH LOSS ARITHMETIC OPERATION UNIT
160: PATH LOSS SETTING MEANS
161 to 16P: PATH LOSS SETTING UNIT
180 (181 to 18P): CORRELATION SETTING UNIT

The invention claimed is:

1. A fading simulator that simulates a multi-input multi-output communication system (MIMO)-type transmission path by adding a fading effect to an input signal, the fading simulator configured to set up a fading parameter having a delay parameter for adding a delay equivalent to a propagation distance of radio waves to the input signal, a Doppler effect parameter for adding thereto a Doppler effect, and a path loss parameter for adding thereto a path loss indicating a reduced level caused by the propagation distance and reflection of radio waves, the fading simulator configured to:
set up a predetermined transition time, at a time of switching of a fading setting using the fading parameter, between the fading setting before switching and the fading setting after switching; and
smoothly change a value of the delay parameter, the Doppler effect parameter and the path loss parameter before the switching to a value of the delay parameter, the Doppler effect parameter and the path loss parameter after the switching during the predetermined transition time,
wherein the fading simulator is further configured to generate:
a delay equivalent to a propagation distance of radio waves,
a Doppler effect for adding a scattering effect of radio waves, and
a path loss indicating a reduced level caused by the propagation distance and reflection of radio waves.

2. The fading simulator according to claim 1, further configured to smoothly change the value of the delay parameter, the Doppler effect parameter and the path loss parameter before the switching to the value of the delay parameter, the Doppler effect parameter and the path loss parameter after the switching, on the basis of a predetermined time response function.

3. The fading simulator according to claim 1, further comprising an operating unit which is operated by a tester and configured to set up a transition time which is input by causing the tester to operate the operating unit.

4. The fading simulator according to claim 1, further configured to:
analyze a smoothing result; and
a display means that displays an analysis result.

5. The fading simulator according to claim 4, further configured to seek the slowness of a change in the Doppler effect within the transition time, when a smoothing result of the Doppler effect parameter is analyzed.

6. The fading simulator according to claim 5, wherein the display means graphically displays the analysis result.

7. A fading simulation method of simulating a multi-input multi-output communication system (MIMO)-type transmission path by adding a fading effect to an input signal, the fading simulation method including a parameter setting step of setting up a fading parameter having a delay parameter for adding a delay equivalent to a propagation distance of radio waves to an input signal, a Doppler effect parameter for adding thereto a Doppler effect, and a path loss parameter for adding a path loss indicating a reduced level caused by the propagation distance and reflection of radio waves, the method comprising:
a transition time setting step of setting up a predetermined transition time, at a time of switching of a fading setting using the fading parameter, between the fading setting before switching and the fading setting after switching; and
a smoothing processing step of smoothly changing a value of the delay parameter, the Doppler effect parameter and the path loss parameter before the switching to a value of the delay parameter, the Doppler effect parameter and the path loss parameter after the switching during the predetermined transition time,
wherein the fading simulation method further includes the steps of:
generating a delay equivalent to a propagation distance of radio waves, generating a Doppler effect for adding a scattering effect of radio waves, and
generating a path loss indicating a reduced level caused by the propagation distance and reflection of radio waves.

8. The fading simulation method according to claim 7, wherein the smoothing processing step includes smoothly changing a value of the delay parameter, the Doppler effect parameter and the path loss parameter before the switching to a value of the delay parameter, the Doppler effect parameter and the path loss parameter, on the basis of a predetermined time response function.

9. The fading simulation method according to claim 7, wherein the transition time setting step includes setting up a transition time which is input by causing a tester to perform an operation.

10. The fading simulation method according to claim 7, further comprising:
a smoothing result analysis step of analyzing a smoothing result performed in the smoothing processing step; and
a display step of displaying an analysis result of the smoothing result analysis step.

11. The fading simulation method according to claim 10, wherein the smoothing result analysis step includes seeking the slowness of a change in the Doppler effect within the transition time, when a smoothing result of the Doppler effect parameter is analyzed.

12. The fading simulation method according to claim 10, wherein the display step includes graphically displaying the analysis result of the smoothing result analysis step.

* * * * *